United States Patent [19]

Erwin

[11] Patent Number: 5,713,165
[45] Date of Patent: Feb. 3, 1998

[54] FOAM-FILLED EXTRUDED PLASTIC DECKING WITH NON-SLIP SURFACE COATING

[75] Inventor: Ronald Dean Erwin, Fayetteville, Ga.

[73] Assignee: Erwin Industries, Inc., Peachtree City, Ga.

[21] Appl. No.: 588,212

[22] Filed: Jan. 19, 1996

Related U.S. Application Data

[63] Continuation-in-part of Ser. No. 497,860, Jul. 3, 1995, which is a continuation-in-part of Ser. No. 427,892, Apr. 26, 1995, abandoned.

[51] Int. Cl.$^6$ .............................. E04F 11/16; E04F 15/10
[52] U.S. Cl. .................. 52/181; 52/309.9; 52/483.1; 52/650.3; 52/737.4; 52/738.1; 52/DIG. 8
[58] Field of Search ................ 52/181, 177, 309.9, 52/585.1, 480, 263, 650.3, 737.4, 738.1, 483.1, DIG. 8

[56] References Cited

U.S. PATENT DOCUMENTS

| | | |
|---|---|---|
| 3,764,245 | 10/1973 | Miyamoto . |
| 3,881,984 | 5/1975 | Soda et al. . |
| 3,957,250 | 5/1976 | Murphy . |
| 4,045,603 | 8/1977 | Smith . |
| 4,304,080 | 12/1981 | Freeman ................... 52/309.9 |
| 4,305,238 | 12/1981 | Harward . |
| 4,433,519 | 2/1984 | Jenkins . |
| 4,555,292 | 11/1985 | Thompson ................ 52/181 X |
| 4,602,765 | 7/1986 | Loper . |
| 4,795,666 | 1/1989 | Okada et al. .............. 52/309.9 X |
| 4,834,585 | 5/1989 | Hasenwinkle . |
| 4,889,669 | 12/1989 | Suzuki . |
| 4,976,063 | 12/1990 | Young . |
| 5,078,367 | 1/1992 | Simpson . |
| 5,087,488 | 2/1992 | Cakmakei . |
| 5,092,076 | 3/1992 | Terreta . |
| 5,253,458 | 10/1993 | Christian . |
| 5,271,878 | 12/1993 | Mizia . |
| 5,360,295 | 11/1994 | Isacksen . |
| 5,412,915 | 5/1995 | Johnson ................... 52/585.1 X |

Primary Examiner—Christopher Kent
Attorney, Agent, or Firm—Arthur A. Gardner & Associates, P.C.

[57] ABSTRACT

A foam-filled extruded plastic decking plank having a non-slip surface coating and a method for making same are described. The non-slip coating includes a layer of acrylic paint applied to the deck surface, grit material applied to the painted decking surface, and a top coat of acrylic paint applied over the grit.

3 Claims, 2 Drawing Sheets

FOAM-FILLED EXTRUDED PLASTIC DECKING WITH NON-SLIP SURFACE COATING

CROSS-REFERENCE TO RELATED APPLICATIONS

The present application is a continuation-in-part of U.S. patent application Ser. No. 08/497,860, filed Jul. 3, 1995, which is a continuation-in-part of U.S. patent application Ser. No. 08/427,892, filed Apr. 25, 1995, now abandoned.

TECHNICAL FIELD

The present invention is directed to foam-filled plastic extruded decking products having a non-slip surface coating and a method for applying such a surface coating.

BACKGROUND OF THE INVENTION

Outdoor decks have become increasingly popular in residential home construction. Homes and apartments, as well as a variety of other buildings, often incorporate exterior decks into their design. Additionally, decks are commonly added onto existing structures. These decks provide convenient spaces for a variety of outdoor activities, including cookouts, dining, and sunbathing, as well as other leisure activities.

Typical deck construction includes: (1) a number of vertical posts which support the remaining structure above the ground; (2) horizontal beams supported above the ground by the vertical posts; (3) a number of horizontal joists, parallel to and uniformly spaced apart from one another and anchored to the beams; and (4) a floor surface of decking planks arranged horizontally and above and perpendicular to the joists.

Wood products have traditionally been the primary source of materials for use in decking construction. However, wood products are becoming increasingly scarce due to the harvesting of trees at ever faster rates and the rather limited rate at which timber resources have been replenished. Also, environmental concerns and environmental regulations directed to the conservation or preservation of forests tend to restrict the availability of wood products. With diminishing availability of timber resources, wood products are becoming increasingly expensive. There is, therefore, a substantial need for long-lasting substitute construction materials that can lessen the need to harvest timber resources.

It has been found that one potential approach to addressing the above need is to provide substitute replacement decking products made of plastic, rather than wood. Because the deck surface must support substantial weight and foot traffic, however, the replacement product needs to be stable and rigid. The material should also be capable of economical manufacture, and be relatively inexpensive. It also needs to be easily fabricated and used in the field.

A variety of plastic building products are known. For example, U.S. Pat. No. 4,045,603 describes a three-layer synthetic construction material made from recycled waste thermoplastic synthetic resin material and cellulose fiber aggregate. This material includes face surfaces consisting essentially of re-hardened fused and rolled thermoplastic synthetic resin material bits, and an intervening core material consisting essentially of a compressed non-homogenous mixture of cellulose aggregate material bits and re-hardened fused thermoplastic synthetic resin material bits.

U.S. Pat. No. 3,764,245 describes an apparatus for producing a light structural board of thermoplastic resin.

U.S. Pat. No. 5,253,458 describes a simulated log made from a cast polyvinylchloride (PVC) pipe, selectively filled with a hard cast foam or a bead type foam. This patent further describes that the cast PVC pipe is first manufactured and then subsequently filled with the foam filler.

These and other known synthetic building products, and methods for their production, tend to require excessive numbers of manufacturing operations at substantial cost. Additionally, known methods for manufacturing foam-filled extruded building products often result in uneven distribution of the foam within the interior of the extruded product, or insufficient bonding between the extruded shell and the foam core, resulting in products having insufficient strength and rigidity for application as a deck material.

An improved foam-filled extruded decking plank and a method for making filled extruded products of that type are shown by the present Applicant's earlier-filed applications, U.S. Ser. Nos. 08/497,860 and 08/427,892, respectively.

A common disadvantage suffered by all previously known synthetic building materials, however, is that plastic surfaces provided thereby tend to be more slippery than traditional wood products. This problem is exacerbated when the building product is used in a decking and the decking surface becomes wet, as from rain or being washed. Additionally, previously known synthetic materials are less wear-resistant than traditional wood decking, and therefore, are more prone to scuffing and to other damage from foot traffic.

The traditional manner of attaching decking planks to the underlying joists is by nailing or screwing through the plank into the joist below. Although this attachment method may be adequate for standard all-wood deck constructions, it does present a number of disadvantages. For example, nail or screw heads exposed on the top surface of the decking planks are not only aesthetically unappealing, but may present tripping hazards as well. This risk is enhanced over time, as the nails may be pried upwards away from the joists by flexing of the deck planks. Additionally, the use of nails or screws necessarily creates holes in the decking planks which may cause the wood to split, and which may accelerate deterioration of the plank caused by weather or insects. Further disadvantages include increased difficulty of cleaning and/or painting the decking planks.

These disadvantages also are inherent in the use of traditional attachment means, such as nails or screws, in connection with synthetic decking components. Also, when traditional attachment means, such as nails or screws, are used to attach synthetic decking, the top surface of the decking plank is commonly more prone to deformation from the fasteners than standard wood decking material, thereby creating a walking surface with indentations around the nails or screws. Because of the manner of construction of synthetic materials, it is generally desirable to provide the nails or screws with washers or oversized heads to prevent the nail or screw from pulling through the decking. The indentations caused by the fasteners may create tripping hazards and prevent water drainage from the decking surface. Standing water remaining in these indentations increases the danger of slipping on the synthetic decking surface. This water also tends to seep into the decking plank through the fastener hole, and may lead to the deterioration of the decking material.

Accordingly, it can be seen there is yet a need in the art for synthetic decking having a surface coating which provides a non-slip walking surface which resists wear from foot traffic and which can be produced and applied economically. It can also be seen that a need yet exists for a decking surface coating which fills indentations caused by nail or screw attachment, and which seals the holes caused by such attachments from external weather damage. It is to the provision of such a decking surface that the present invention is directed.

SUMMARY OF THE INVENTION

Briefly described, in a preferred form the present invention comprises a synthetic decking material having an extruded plastic outer shell, an expanded foam core within said outer shell and a non-slip surface coating applied to the outer shell. The non-slip surface coating preferably includes a first, grit-carrying layer of an acrylic paint to which a grit material has been added, which is applied to the decking surface, preferably after the decking planks have been attached to the underlying support structure. A top layer of acrylic paint is then applied over the grit-carrying layer.

Accordingly, it is an object of the present invention to provide a synthetic decking material having a non-slip surface.

It is another object of the present invention to provide a surface coating which is durable, resistant to wear from foot traffic, and which permanently adheres to synthetic decking surfaces.

A further object of the present invention is to provide a coating for synthetic decking materials which effectively fill any indentations in the decking surface caused by fasteners, and which seals the surface from external water damage.

Yet another object of the present invention is to provide a process for applying a non-slip surface coating to a decking surface.

These and other objects, advantages, and features of the invention will become more apparent upon reading the following specification in conjunction with the accompanying drawing figures.

BRIEF DESCRIPTION OF THE DRAWING FIGURES

DETAILED DESCRIPTION OF THE PREFERRED EMBODIMENT

Figure 1:
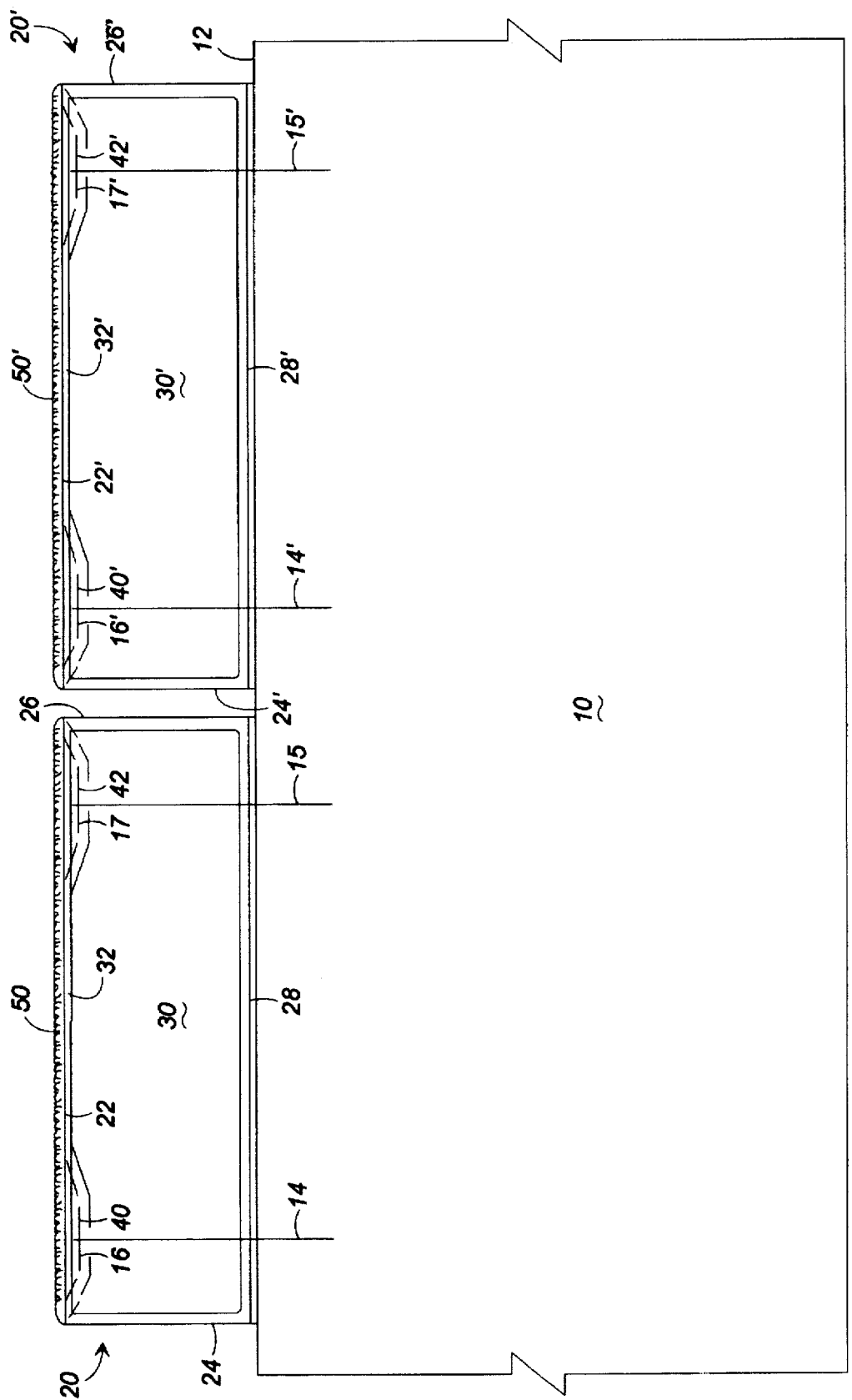
FIG. 1 shows, in cross section, a representative pair of foam-filled extruded decking planks attached to a typical support joist and having a non-slip coating applied to their top surfaces according to a preferred form of the present invention.

Referring now in detail to the drawing figures, FIG. 1 shows a representative pair of extruded foam-filled decking planks 20, 20' according to a preferred form of the present invention. Planks 20, 20' are shown attached to a typical support joist 10 by fasteners 14, 15, 14', 15' and having non-slip surfaces 50, 50'. Support joist 10 is typically standard 2×8 or 2×10 lumber, but may be any of a variety of known building materials capable of supporting the decking surface. Support joist 10 has an upper surface 12 upon which decking planks 20, 20' are mounted.

Plank 20 will now be described in greater detail, it being understood that the construction of plank 20' is identical. Plank 20 is preferably a foam-filled extruded member produced according to the method of applicant's earlier U.S. patent application Ser. No. 08/427,892, the contents of which are incorporated herein by reference. As show in FIG. 1, plank 20 is of rectangular cross section, but alternatively, can include the grooved attachment profile of applicant's earlier U.S. patent application Ser. No. 08/497,860, which is also incorporated herein by reference. Decking plank 20 is preferably of equal thickness and width as standard "two-by" lumber, such as nominal two-by-six planks (1½" by 5½"). Plank 20 has a top surface 22, two sides 24, 26 and a bottom 28. When assembled, bottom 28 rest upon top surface 12 of support joist 10.

The foam-filled extruded decking planks 20, 20' of the present invention comprise an expanded foam core 30, 30' and an outer resilient plastic shell 32, 32'. The decking planks 20, 20' of the present invention are produced by an extrusion process, more fully described below, which provides even distribution of the foam core 30, 30' within the interior of the outer resilient plastic shell 32, 32', and which results in a strong bond between shell 32, 32' and core 30, 30'.

Decking planks 20, 20' are fabricated continuously, and can be of virtually any length. Foam core 30, 30' is preferably expanded polyurethane, but other materials such as polyesters and epoxies can be used as well. The outer polymer shell 32, 32' is preferably polyvinylchloride (PVC), but other materials such as acrylic, ABS, polyethylene, polycarbonate, and blends and alloys of two or more of these materials can be used. The polymer shell 32, 32', once hardened, will preferably have a thickness ranging from 0.005 to 0.250 inches, and the foam will preferably have a density ranging from 1 to 30 lbs/ft$^3$. Plastic shell 32, 32' can be fabricated with a simulated woodgrain outer surface and can be of a variety of colors.

Decking planks 20, 20' can be fastened to support joist 10 by fasteners 14, 15, 14', 15', or alternatively, by the decking attachment system described in earlier U.S. patent application Ser. No. 08/497,860. Fasteners 14, 15, 14', 15' can be nails, screws, or any other known fastening means. Preferably, if nails or screws are used as fasteners, they will be provided with oversized heads 16, 17, 16', 17' to prevent the fasteners from pulling through the outer plastic shell 32, 32' of the decking planks 20, 20'. Alternatively, nails or screws of standard head size can be fitted with washers to prevent pull-through.

As shown in FIG. 1, because the expanded foam core 30, 30' is compressible, and because the outer plastic shell 32, 32' is relatively thin, fasteners 14, 15, 14', 15' will cause a local downward deformation of the top surface 22, 22' of decking plank 20, 20'. This downward deflection causes small indentations 40, 42, 40', 42' in top surface 22, 22'.

It is often deskable to provide the top surfaces of decking planks 20, 20' with a non-slip coating 50, 50'. In addition to potentially reducing the likelihood of slips and falls, coating 50, 50' serves the additional purpose of at least substantially filling indentations 40, 40' and weathersealing holes caused by fasteners. Coating 50, 50' is preferably a urethane coating containing a non-slip grit material.

The preferred method of applying non-slip coating 50, 50' to the decking will now be fully described. Decking planks 20, 20' are first attached to the underlying structure, such as support joist 10. Fasteners 14, 15, 14', 15' are installed to secure the decking planks. The top surfaces 22, 22' are then coated with acrylic paint. The acrylic paint may be applied by brushing, spraying, by roller, or other means. Next, a grit material is applied to the still-wet painted top surfaces, 22, 22'. Alternatively, the grit material may be added to the paint to form a grit mixture which is then applied to top surfaces 22, 22'. The grit material may be sand or other small particulate matter. Finally, a thin top coat of acrylic paint is applied over the grit material to seal the grit in the layers of acrylic paint. Preferably, the coating material is applied in sufficient thickness to substantially fill any indentations 40, 40', 42, 42' to provide a smooth upper walking surface.

In some instances, it may be preferable to apply the non-slip coating to the decking planks prior to attaching the decking planks to the support structure. In this manner, the surface coating may be applied during production of the extrusions, within the more controlled environment of the production facility. If this is done, alternate methods of filling the fastener indentations and weather-sealing the fastener holes will be required after the decking planks are fastened to the support structure.

The decking planks 20, 20' to which the non-slip surface coating of the present invention can be applied can be fabricated according to any known method of production of synthetic building product capable of carrying typical floor loads for deck applications. Standard wood lumber decking material can also be coated with the non-slip coating. Most preferably, however, decking planks 20, 20' are synthetic extrusions produced according to the method described below.

Figure 2:
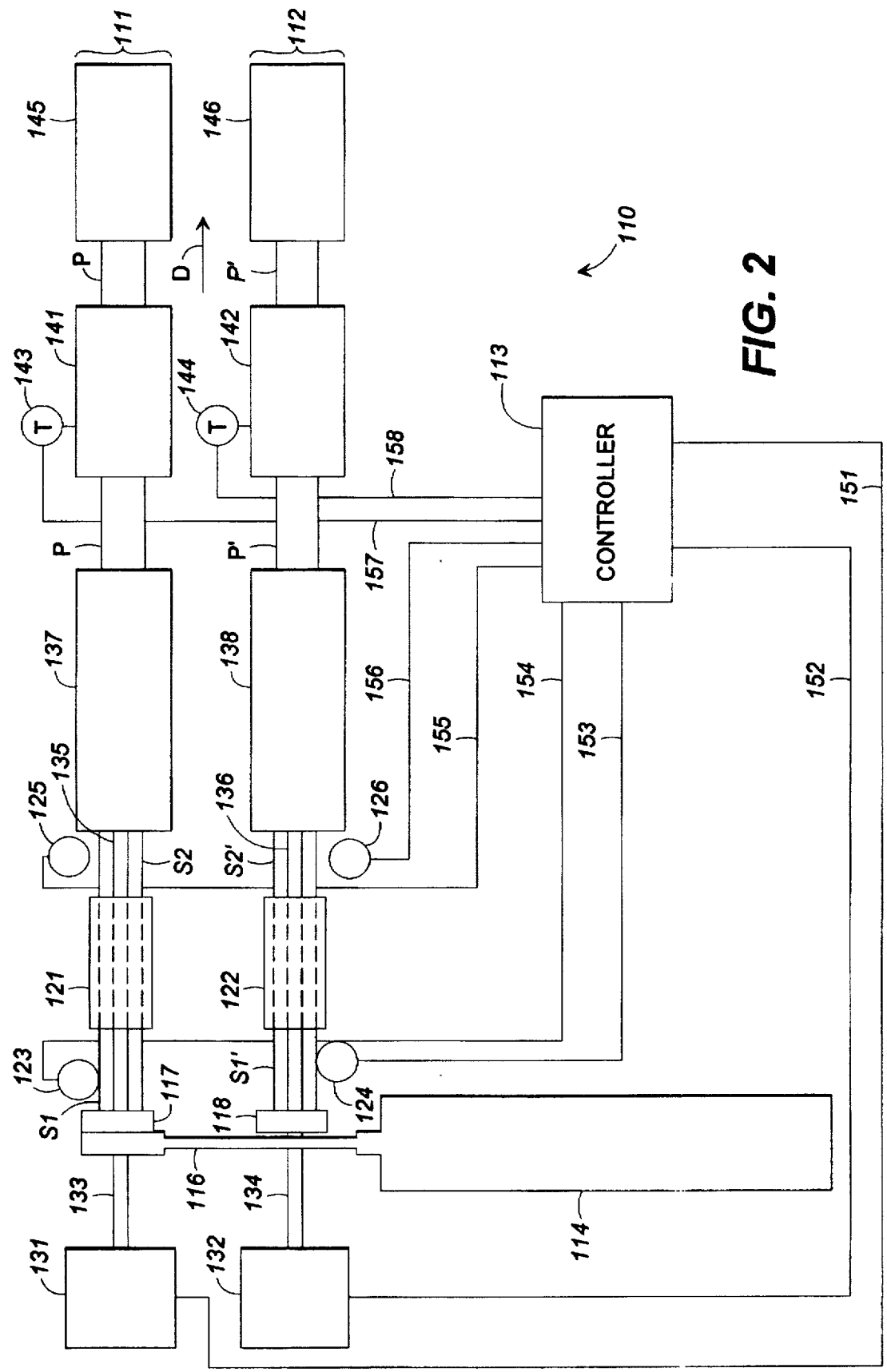
FIG. 2 is a schematic diagram of a system for manufacturing a foam-filled extruded product according to a preferred form of the present invention and showing various electrical and mechanical components for use therein in schematic form.

FIG. 2 shows a manufacturing system 110 for carrying out the process of manufacturing the above-described planks according to the invention. Manufacturing system 110 includes first and second extrusion lines 111 and 112, with two (2) lines shown for illustration purposes. Of course, those skilled in the art will readily recognize that only one extrusion line could be employed or that more than two extrusion lines could be employed, as desired. The extrusion lines 111 and 112 are each controlled by a common electronic controller 113. The electronic controller can take any of several know forms, such as a programmable logic controller (PLC) or a personal computer adapted for such application.

A common extruder 114 feeds both extrusion lines 111 and 112. The extruder can be of any number of known types, but typically includes an internal auger (not shown) for metering and pumping plastic pellets or powders and a heating element for heating the plastic pellets or powders to melt them to provide a heated thermoplastic discharge suitable for use in the extrusion lines. Moreover, as those skilled in the art will also understand, the extruder 114 typically is fed by known metering or blending equipment for providing a desired controlled quantity of plastic pellets to the extruder and/or for maintaining a preset recipe of plastic pellets or powder to provide a desired composition of the plastic to be extruded. The extruder output is heated thermoplastic which is forced through a "Y-block" or divider 116 for providing equal flows of plastic to first and second crosshead dies 117 and 118. These crosshead dies 117 and 118 are somewhat similar in construction and operation to those used to coat electric wire with an outer plastic insulation sheath. Each of the crosshead dies 117 and 118 includes an internal (not shown) mandrel or core element, which together with the outer (interior) surface of the crosshead die operate to define the shape and wall thickness of the extruded plastic product discharged from the crosshead dies.

Initial sizing and cooling sleeves 121 and 122 are position to receive the extruded product from the crosshead dies 117 and 118. These initial sizing and cooling sleeves 121 and 122 are conventional vacuum units. These initial sizing and cooling sleeves provide a rough initial shape and some initial cooling to stabilize the extruded plastic shell. The extruded plastic shell 32, 32' is indicated at S1 and S1' in FIG. 2. As depicted in the figure, the initial sizing and cooling sleeves 121 and 122 are spaced a short distance from the crosshead dies 117 and 118 to expose this section of the outer shell S1 and S1'. This then allows sensors to be positioned adjacent the outer shells S1 and S1' to detect any interruption in the extrusion of the outer shell. Such sensors are depicted at 123 and 124 in FIG. 2 and can take any number of known forms. For example, a photo emitter and a photo detector can be used to detect when there is a break in the extrusion. Alternatively, a motion sensor or proximity sensor can be used.

Another pair of similar sensors 125 and 126 are positioned downstream (after) the initial sizing and cooling sleeves 121 and 122. These second sensors 125 and 126 also operate to detect a break in the outer shell of the extrusion.

A pair of foam mixing and metering devices 131 and 132 pump metered quantities of liquid foam at controllable pressures through liquid foam supply conduits 133 and 134, preferably at room temperature. These liquid foam supply conduits 133 and 134 extend through the crosshead dies 117 and 118 and through the initial sizing and cooling sleeves 121 and 122. The open (discharge) ends 135 and 136 are positioned downstream of the initial sizing and cooling sleeves 121 and 122. Thus, the liquid foam is pumped and metered from the foam mixing and metering devices 131 and 132 through the crosshead dies 117 and 118 and through the initial cooling and sizing sleeves 121 and 122 and into the interior of the initially cooled and sized outer shells S2 and S2'.

Secondary sizing and cooling sleeves or tanks 137 and 138 are positioned downstream from the open discharge ends 135 and 136 of the liquid foam supply conduits 133 and 134. The open ends of liquid foam supply conduits 133 and 134 are positioned approximately 6" to 12" from the secondary sizing and cooling tanks 137 and 138 and the liquid foam is allowed to drop away from the extrusion lines in the event that break occurs. In this way, the secondary sizing and cooling sleeves 137 and 138 receive the extruded outer shells S2 and S2' (which have been initially cooled and sized), now filled with expanding or expanded foam which forms the foam cores 30, 32' of the extruded foam-filled decking planks of the present invention. The secondary sizing and cooling tanks provide the foaming and cross-linking reactions and cool the overall article, thereby causing the foam to solidify and the article to take the desired shape. These secondary sizing and cooling sleeves or tanks 137 and 138 further define the exterior dimensions and shape the outer shell S2 and S2', with the discharge from these sleeves or tanks being a finished extruded product P and P'.

The secondary sizing and cooling sleeves or tanks 37 and 138 are rather long in comparison to the initial sizing and cooling sleeves 121 and 122 and utilize a water jacket or water film to minimize the friction between the shell S2 and S2' and the secondary sizing and cooling sleeves 137 and 138. The water film or jacket also helps to cool the outer shells S2 and S2' (and the liquid foam contained therein, now rapidly cooling and hardening to form a rigid structure). The water is preferably at a temperature of approximately 60° F. and the foam expands and sets within 30 to 45 seconds. The water also helps tend to avoid marring the external finish of the outer shells of the product P and P1. Furthermore, the secondary sizing and cooling sleeves preferably are coated with chrome or Teflon® (PFTE) to further reduce friction. The initial sizing and cooling sleeves 121 and 122 may also be coated with chrome or Teflon® if desired. The use of water-jacketed sizing and cooling sleeves is known in the art in connection with very large diameter extrusions, such as 36-inch diameter plastic pipe. However, the use of such a water-jacketed sleeve in connection with small diameter extrusions (on the order of 12 inches or less) has not been known by the applicant heretofore. Nor has the applicant been aware of the use of both an initial sizing and cooling sleeve (121 and 122) together with a secondary sizing and cooling sleeve (137 and 138).

Pullers 141 and 142 operate to pull the extruded product P and P' along the extrusion lines 111 and 112. These pullers are of conventional design and include, for example, endless tracks which engage the outer surface of the extruded product for pulling the extruded product in a downstream direction (indicated by arrow D). Each of these pullers has associated therewith a torque sensor 143, 144 for monitoring the torque of the puller being applied to the product P and P'. If the torque exerted by the pullers 141 or 142 suddenly drops to zero or near zero, this is an indication that a break has occurred in the extrusion.

The product P and P' is further conveyed by the pullers 141 and 142 to a saw or other cut off device 145, 146 for cutting the extruded product P, P' into pieces of a predetermined or desired length.

A coating machine (not shown) may be added to the manufacturing system at any point after secondary sizing and cooling sleeves 137, 138 to apply the non-slip coating to the product P, P' during production.

Electrical cabling 151–158 connects the controller 113 with foam mixing and metering devices 131 and 132 and with the sensors 123 and 124, 125 and 126, and 143 and 144.

In operation, liquid foam is pumped from the liquid foam mixing and metering devices 131 and 132 through the conduits 133 and 134 through the crosshead dies 117 and 118 and ultimately discharges at the discharge ends 135 and 136 into the interior of the semi-cooled outer shells S2 and S2'. This takes place at the same time as the extrusion of the outer shells by the crosshead dies 117 and 118, the initial sizing and cooling sleeves 121 and 122, and the secondary sizing and cooling sleeves 137 and 138.

This simultaneous injection of the liquid foam into the interior of the extruded shell during the extrusion process provides for superior bonding of the foam to the interior wall of the outer shell. This also provides for superior filling (avoiding voids) of the foam core 30, 30' in the interior of the outer shell 32, 32'. Another advantage of this simultaneous injection-extrusion process is that it minimizes the number of manufacturing steps or subsequent steps that have to be taken. This also tends to make the manufacture of the foam-filled extruded product very economical and requires a minimal amount of manufacturing floor space. The result is an economical, extremely strong final product.

While the invention has been disclosed in preferred forms, it will be apparent to those skilled in the art that many additions, deletions, and modifications may be made therein without departing from the spirit and scope of the invention as set forth in the following claims.

What is claimed is:

1. A non-slip decking plank comprising:

a. an extruded rectangular hollow plastic outer shell having a top, bottom, and two side portions, said top having an outer surface, and wherein said top has a width greater than a height of said side portions;

b. an expanded foam core within said outer shell substantially filling said outer shell; and c. a non-slip surface coating applied to said outer surface of said top of said outer shell, said non-slip coating comprising a grit-carrying layer and a top layer.

2. The decking plank of claim 1 wherein said extruded plastic shell is made of polyvinylchloride.

3. The decking plank of claim 1 wherein said grit-carrying layer comprises a mixture of acrylic paint and a grit material and wherein said top layer comprises acrylic paint.

* * * * *